June 9, 1964  W. J. SIDEBOTTOM ETAL  3,136,701
DEVICE FOR SHUTTING DOWN OF NUCLEAR REACTORS
Filed April 14, 1960  5 Sheets-Sheet 4

United States Patent Office 3,136,701
Patented June 9, 1964

3,136,701
DEVICE FOR SHUTTING DOWN OF
NUCLEAR REACTORS
William Joseph Sidebottom, Timperley, Altrincham, and Leslie Maurice Fletcher, Leigh, England, assignors to United Kingdom Atomic Energy Authority, London, England
Filed Apr. 14, 1960, Ser. No. 22,204
Claims priority, application Great Britain Apr. 17, 1959
5 Claims. (Cl. 176—86)

This invention relates to the shutting down of nuclear reactors, and in particular to devices therefor.

Belgian patent specification No. 580,506 (which corresponds to application Serial No. 824,248, filed July 1, 1959, and held allowable, now U.S. Patent No. 3,087,-884) describes a device for shutting down a nuclear reactor, wherein neutron-absorbing balls are restrained in a position above the reactor core boundary by a magnetic field provided by electro-magnetic means and effective across one or more passages for the balls in a manner such that the balls are held against discharge into the reactor core whilst the magnetic field is maintained. On removal of the magnetic field the balls are freed to fall into a vertical tube penetrating the reactor core. However, the said passages are somewhat restricted and are inclined such that abrupt change of direction of the balls takes place during discharge. Thus discharge of a quantity of balls sufficiently large to effect shut-down can take a marked period of time.

It is an object of the present invention to provide shut-down devices having an improved speed of operation.

According to the present invention, a device for shutting down a nuclear reactor has a tube adapted to engage a substantially vertical channel in the reactor core, the tube having its lower or non-charging end normally closed and containing a baffle providing an annular space bounded by the wall of the tube and the baffle and which can receive, on discharge from a magazine disposed above the said tube, a multiplicity of neutron absorbing balls, the said tube being removable from the reactor core and having its lower end openable for recovery of the said balls after operation of the device.

The said balls may be retained in the magazine by a normally closed valve, the valve being operable remotely to open it and release the balls to fall into the said annular space in the tube on operation of the device. The said valve is preferably held closed by electromagnetic means, interruption of the circuit of which serves to release the valve so that its weight, together with the weight of the balls which it retains, opens it and releases the balls.

Where the device is intended for use in a gas-cooled nuclear reactor having its core contained in a pressure vessel and provided with a neutron shield above the core and within the pressure vessel, the device may be adapted to be disposed so that its magazine engages a channel in the neutron shield (which channel is aligned with the core channel containing the said tube) so that the said balls register with the neutron shield and are effective, when the device is non-operative, to assist in shielding.

An embodiment of the invention will now be described with reference to the accompanying drawings, wherein:

FIGURES 3, 4 and 5 are drawn to larger scales than that of FIGURE 2.

Figure 1:
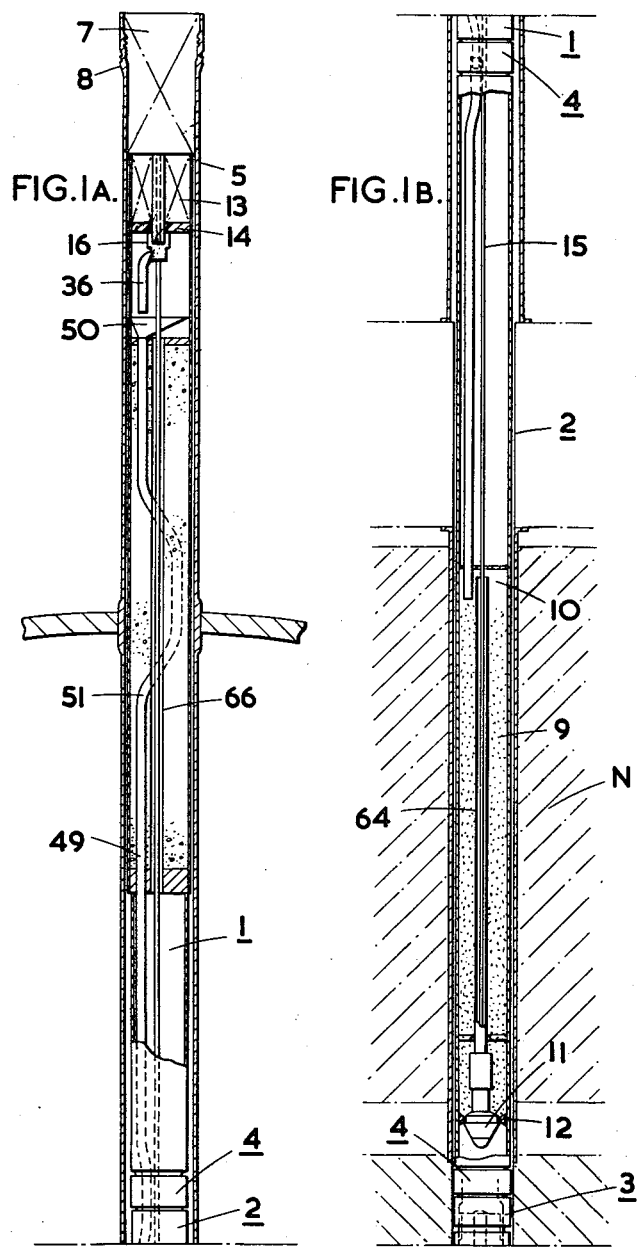
FIGURES 1A, 1B and 1C are side views in medial section of a shut-down device according to the invention, divided for the sake of clarity.
Figure 5:
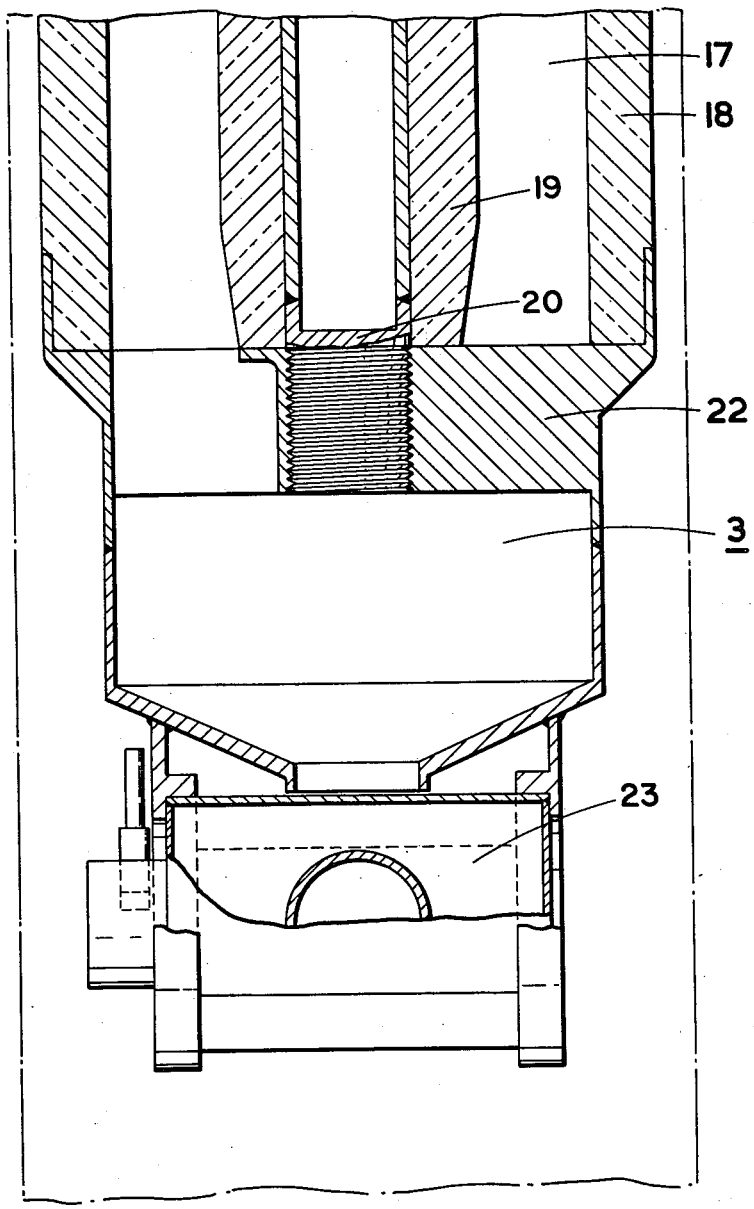
FIGURE 5 is a similar view to FIGURE 2 and shows detail in that part of the device shown generally in FIGURE 1C.

Referring to the drawings, in FIGURES 1A, 1B and 1C thereof, an emergency shut down device for a gas cooled nuclear reactor comprises an upper part 1, centre part 2, and lower part 3; the three parts of the device being flexibly interconnected by two identical ball locking devices 4 of known kind. A reactor of the said kind typically employs fourteen symmetrically disposed shut down devices and each penetrates a reactor charge tube 5 and a channel 6 within a neutron shield N and core C of the reactor, being supported by a shield plug 7 releasably connected to the upper end 8 of the respective charge tube 5. A multiplicity of neutron absorbing balls 9 (stainless steel ¼" diameter ball shot containing approximately 1% boron) is retained in a magazine 10, within the centre section 2, by a valve closure plug 11 and seating 12. The valve plug is controlled by an electro-magnet 13 having an armature 14 from an attachment member 16 of which the valve plug depends by a cable 15. An annulus 17 is formed by co-axial graphite sleeves 18 and 19 composed of loosely stacked annular bricks, the inner sleeve 19 which forms a baffle being mounted on a mandrel 20 which is located by two end grid plates 21 and 22. A rotatable shut off valve 23 (shown in more detail in FIGURE 5) is located at the lower end of the part 3.

During normal reactor operation the shut down device is housed in its primed condition with the neutron absorbing ball shot material stored above the upper level of the reactor core. The magnet 13 is energised by power supplied from an external source. On interruption of the electrical power supply (automatically effected under emergency conditions), the magnet releases the valve to discharge the ball shot 9 into the annulus 17 disposed within the core of the reactor whereby the neutron absorbing characteristics of the ball shot due to their boron content serve, in conjunction with the absorption brought about by operation of the other similar devices with which the reactor is provided, to shut down the reactor. The column of neutron absorbing material formed within the annulus 17 and extending over the full depth of the core, requires considerably less ball shot than would one of the same depth in the absence of the baffle 19, and in consequence, less time is taken to fill the column with balls and shut down the reactor than would be necessary in the absence of the sleeve 19. Furthermore the storage magazine 10 can be of correspondingly reduced proportions, thus facilitating the housing of the device within a charge tube and the necessity for absence of projection above the charge face. The device is disposed within the reactor such that, in its primed condition, the column of ball shot registers with the neutron shield to provide a shield plug within the channel therein.

Figure 2:
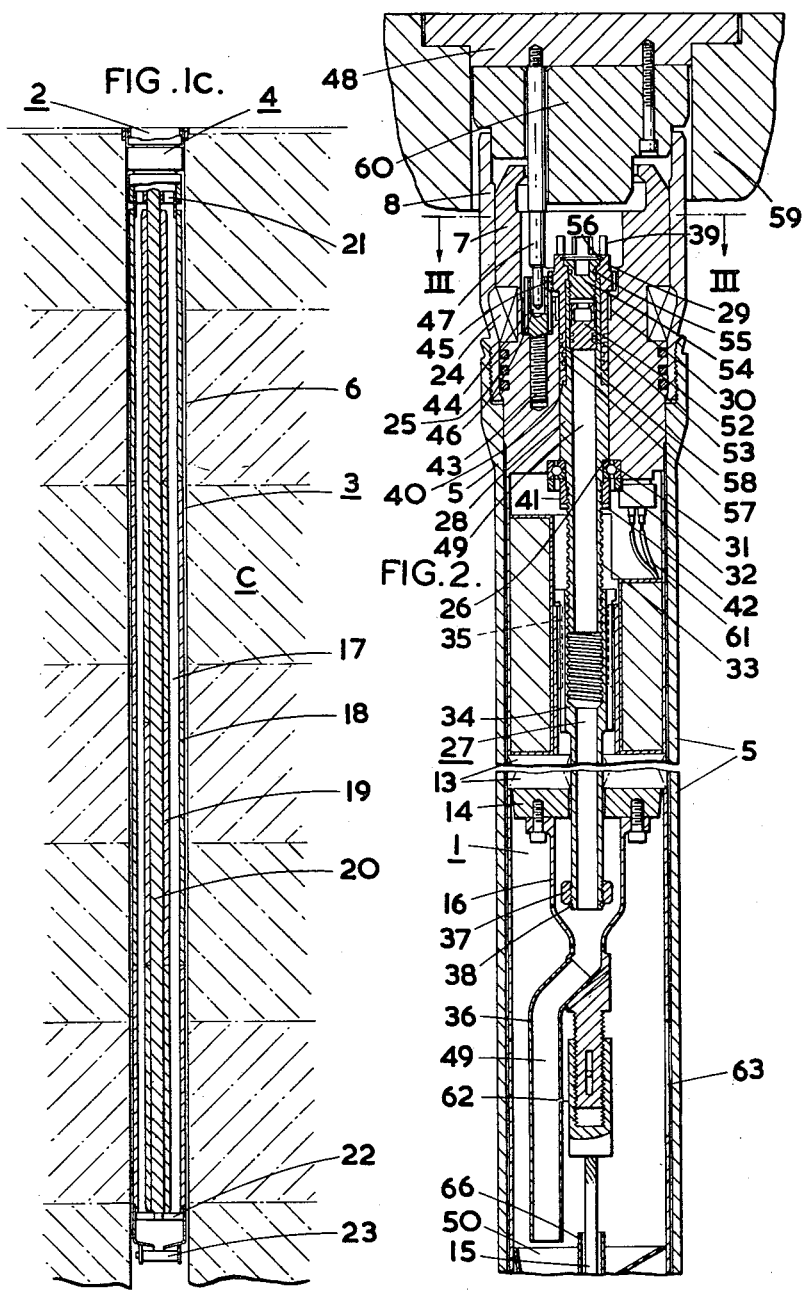
FIGURE 2 is a fragmentary side view in medial section, drawn to a larger scale than that of FIGURES 1A–1C, of detail in part of the device shown generally in FIGURE 1A.

Referring now to FIGURE 2, which shows the mechanism of the upper part 1 of the device in more detail, shield plug 7 of the device is releasably secured to the upper end 8 of a charge tube 5 by any suitable locking device 24 and the shield plug 7 furthermore seals against reactor coolant pressure by sealing rings 25 carried by the shield plug 7. The shield plug also carries restoring mechanism generally indicated by the reference numeral 27 and consisting of a tubular member 28 having a driving sleeve 29 journalled in a bush 30 and a ball race 31 both disposed in the shield plug 7. The ball race 31 is retained in the shield plug 7 by a retaining plate 32 and provides endwise location by engagement with a shoulder 26 on the member 28. The member 28 has an external screw thread 33 engaging an internally screwthreaded tubular member 34 which penetrates the electro magnet 13 and the armature 14 and is rotatably restrained by internal splines 35 provided on the lower part of the shield plug 7. The member 34 carries a screwed collar 37 locked by a circlip 38. The driving sleeve 29 is adapted for engagement with mechanical driving means (not shown) by dogs 39 and is operably connected to the member 28 by dogs 40. The inner ring of the ballbearing 31 is secured to the member 28 by a retaining nut 41 and a locking nut 42. Rotation of the sleeve 29 in a clockwise direction (as viewed from above) effects axial movement of member 34 to bring the collar 37 into abutting and supporting contact with the armature 14. After the device has been tripped by interruption of the power supply to the magnet 13 with consequent opening of the valve plug 11 and discharge of the ball shot, the restoring mechanism 27 can be employed to return the armature to, and maintain it in, the valve closed position during the repriming operations necessary after the device has been operated.

An interlock for the restoring mechanism consists of a pin 43 screwed into the seal plug 7 and having integral external gear teeth 44 which mesh with external gear teeth 45 of the driving sleeve 29. A counterbore 46 in the end of pin 43 offers a socket to a pin 47 carried by a cover plate 48. Rotation of sleeve 29 in operation of the restoring mechanism 27 effects contra-rotation through the gear teeth 44, and gear teeth 45 of the pin 43 thereby unscrewing it from the seal plug. Replacement of cover plate 48 is thus prevented until the armature restoring mechanism 27 is disengaged from the armature 14, thereby freeing the armature for subsequent operation and ensuring that a primed device cannot be completely installed in the reactor until the electromagnet is energised and the armature is free to move on interruption of the current to the electromagnet.

Figure 3:
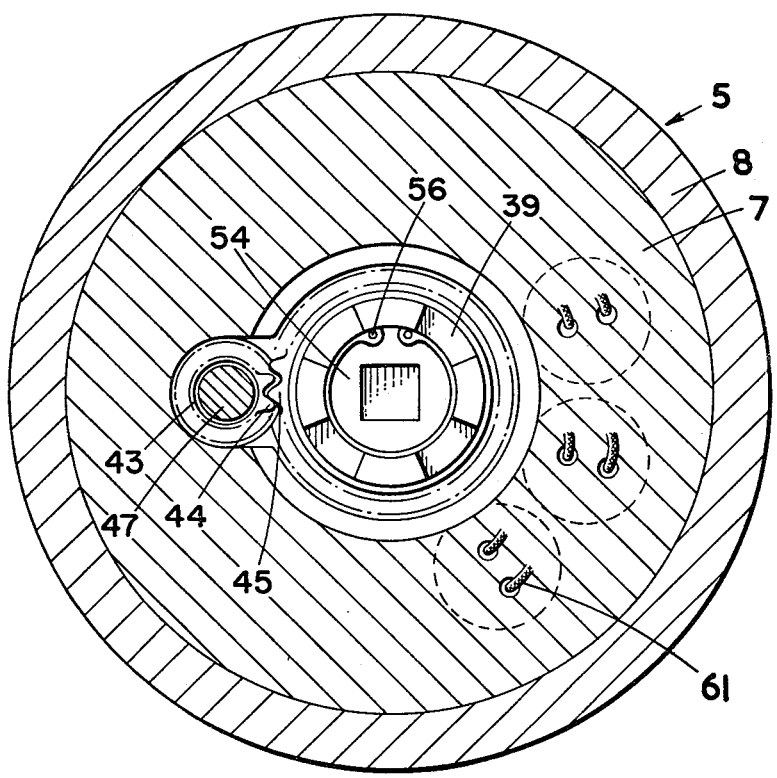
FIGURE 3 is a plan view in section on line III—III of FIGURE 2.
Figure 4:
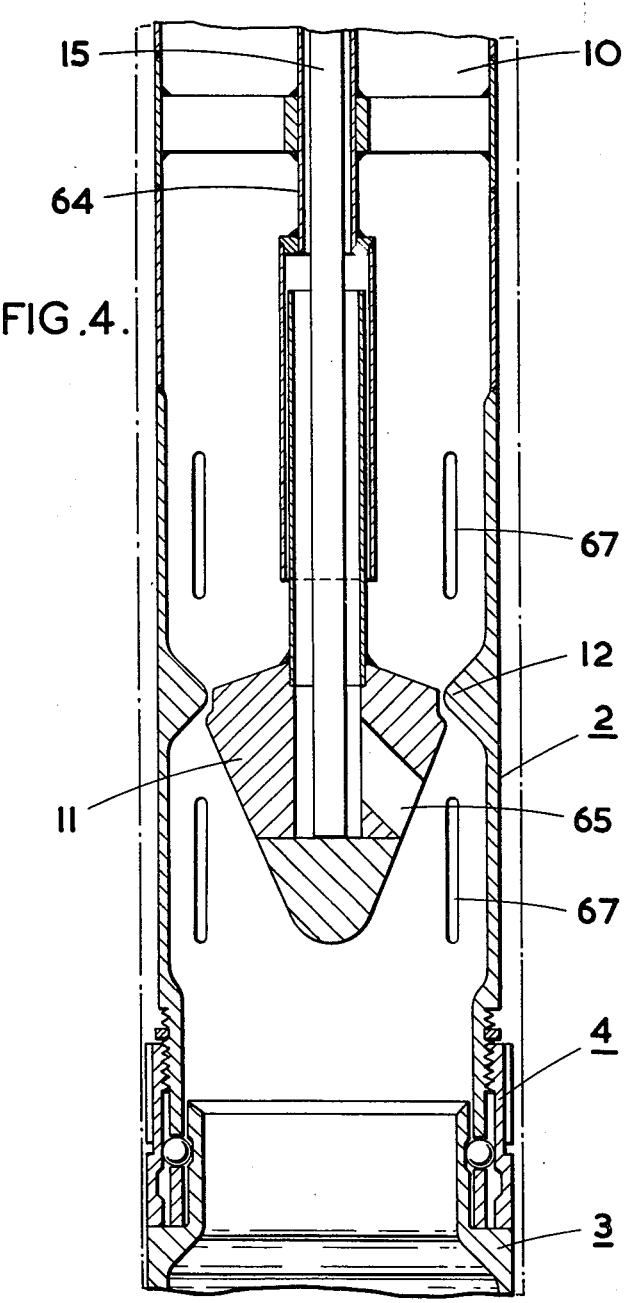
FIGURE 4 is a similar view to FIGURE 2 and illustrates more particularly detail in that part of the device shown generally in FIGURE 1B.

A duct 49 extends from the upper end of the device to the magazine 10 and comprises the hollow interior of the restoring mechanism 27 (FIGURE 2), the interior and a side branch pipe 36 of the cable attachment member 16, a tundish 50 (both FIGURE 1A and 2) and a feed tube 51 looped to prevent neutron streaming. After discharge of the ball shot from the magazine 10 to the annulus 17, the device is subsequently reprimed by draining the shot through the valve 23 and returning it to the magazine by the duct 49. The latter is sealed (see FIGURE 2) against reactor pressure by a primary seal plug 52 fitted with sealing rings 53, and a screwed plug 54, with a sealing ring 55, for retaining the plug 52 in sealing position. Screwed plug 54 is locked in position by a circlip 56. Sealing rings 57 and 58 effect sealing between the mechanism 27 and the shield plug 7. The cover plate 48 is supported by biological shielding 59, and carries a secondary shield plug 60; it also provides for the passage of electrical circuitry from an external source to the electromagnet 13 by leads 61 (FIGS. 2 and 3). Valve setting adjustment is provided for by the screwed adjuster 62 on the cable attachment member 16, access thereto being possible when the device is withdrawn from the charge tube 5, through an orifice 63 in the wall of the upper part 1 of the device. The cable 15 is guided within the magazine 10 by a guide tube 64 (see FIGURES 1B and 4) and through the lower part of the shield plug 7 by a tube 66 (FIGURES 1A and 2). A passage for coolant gas through the device is provided for by slots (not shown) at the bottom of the lower part 3 of the device, slots 67 (FIGURE 4) in the wall of the centre part 2 adjacent to the valve seating, a duct 65 in the valve body 11 communicating with the interior of tubes 64 and 66, and orifice 63.

To reprime, the device is withdrawn from the reactor by a refuelling machine and is serviced remotely in a resetting facility.

Numerous advantages accrue from the use of a shut down device as herein described: by use of the refuelling machine, the device can be withdrawn for maintenance or testing and replaced by a primed device without affecting the pressure circuit of the reactor; the device will operate efficiently under circumstances which result in high distortion of the reactor core; and in the event of failure of the electrical circuitry or magnet the device fails safe.

We claim:

1. A device for shutting down a gas cooled nuclear reactor comprising a removable tube in a substantially vertical reactor channel; a magazine containing a plurality of neutron-absorbing balls and disposed at an intermediate position along said tube, said magazine having a discharge opening; a movable closure member for said opening; electromagnetic means comprising a magnetically held releasable armature in an end portion of said tube; flexible means connecting said armature and closure member for moving said closure member between a position opening said discharge opening and a position closing said discharge opening in response to movement of the armature; a ball receiving chamber in the other end portion of said tube and communicating with said discharge opening to permit flow of said balls to said chamber during operation of the device, said tube having an operating position in the vertical channel wherein the ball receiving chamber is disposed in register with the reactor core and below said magazine; valve means on said chamber for releasing said balls from said chamber after operation of the device and removal of said tube from its operative position; duct means within the tube for refilling said magazine from the said one end portion; and a locking member for releasably securing said tube in the reactor channel.

2. A device accordig to claim 1, wherein the wall of said tube is provided with at least two apertures for allowing gaseous coolant from the reactor channel to enter, flow along and leave the interior of the tube for cooling the components therein.

3. A device according to claim 1 and further comprising screw means to return and releasably retain said armature to its magnetically held position thereby closing said closure member and permitting resetting of the device while preventing untimely removal of the closure member.

4. A device according to claim 3 and further comprising an interlock for preventing the device from being fully prepared for operation until said screw means has been released from mechanically retaining the armature in its magnetically held position.

5. In combination with a gas-cooled nuclear reactor having an internal neutron shield disposed above the core of the reactor and within the reactor pressure vessel, a device according to claim 1, releasably secured in a vertical channel of the reactor with its magazine in register with the internal neutron shield so that the balls contained in the magazine ready for discharge provide a shield plug within that part of the channel which extends through the neutron shield.

References Cited in the file of this patent

NAA-SR-1049, issued Sept. 1, 1954, declassified Mar. 15, 1957, pp. 86-91.